United States Patent [19]

Dueweke

[11] Patent Number: 5,052,264
[45] Date of Patent: Oct. 1, 1991

[54] MUSIC PERFORMANCE ASSISTING METHOD

[76] Inventor: Paul W. Dueweke, 1646 Portola, Palo Alto, Calif. 94306

[21] Appl. No.: 321,052

[22] Filed: Mar. 9, 1989

[51] Int. Cl.$^5$ .............................................. G09B 15/00
[52] U.S. Cl. ................................ 84/470 P; 84/470 R
[58] Field of Search .......................... 84/470 R, 470 P

[56] References Cited

U.S. PATENT DOCUMENTS

| | | | |
|---|---|---|---|
| 3,817,144 | 6/1974 | Okamoto | 84/470 |
| 4,112,809 | 9/1978 | Sjostrand et al. | 84/470 R X |
| 4,732,072 | 3/1988 | Garlock | 84/470 R |

Primary Examiner—Steven L. Stephan
Assistant Examiner—Emanuel Todd Voeltz

[57] ABSTRACT

A method to assist a musical performer to learn or to perform a multi-voice musical piece comprises: 1) the transmission of a solo performance of a single voice of the musical piece synchronized with the overall performance of that piece and 2) the reception of that transmission by some other performer who needs assistance with his performance of the piece and who uses that reception as a lead performance. The method utilizes two pieces of electronic hardware: 1) one or more radio frequency transmitters, each of which is transmitting a lead performance of a different voice of the musical piece within the confines of the performance area and 2) one or more radio frequency receivers and earphones worn by each using performer within this performance area, each of which is tuned in to one of these lead performance transmissions. Each of the transmitters would broadcast a lead performance of a different voice of the musical piece originating from a soloist performing that voice. Each receiver and earphone worn by a using performer would be tuned to the transmitted voice of interest to that user.

18 Claims, 2 Drawing Sheets

MUSIC PERFORMANCE ASSISTING METHOD

FIELD OF INVENTION

The present invention relates to methods for learning music or for facilitating the performance of music. The invention is a method for assisting either a musician or a non-musician to learn or to perform one voice* (e.g., the first violin) of a multi-voice musical piece (e.g., a symphony).

*The word voice used throughout this disclosure refers to a melodic part of a vocal or instrumental piece of music performed by a particular type of singer or instrument which is distinct from other types of singers or instruments performing the same or different melodic parts of the same musical piece. The major vocal voices are soprano, alto, tenor, and bass. In instrumental works, the word voice and instrument are normally interchangeable (e.g., first violin, base, clarinet, French horn, etc.).

SUMMARY OF THE INVENTION

The music performance assisting method comprises: 1) the transmission of a solo performance of a single voice of a musical piece synchronized with the overall performance of that piece either at a normal performance or at a rehearsal and 2) the reception of that transmission by some other performer who needs assistance with his performance of the piece and who uses that reception as a lead performance. The method utilizes two pieces of electronic hardware: 1) one or more radio frequency transmitters, each of which is transmitting a lead performance of a different voice of the musical piece within the confines of the performance area and 2) one or more radio frequency receivers and earphones worn by each using performer within this performance area, each of which is tuned in to one of these lead performance transmissions. Each of the transmitters would broadcast a lead performance of a different voice of the musical piece originating from a soloist performing that voice or from one or more quality musicians within that voice section. Each receiver and earphone worn by a using performer would be tuned to the transmitted voice of interest to that user. This invention could be used either during rehearsals to assist in learning the musical piece or during actual performances to facilitate the performance of the piece. In addition, it could be used by any listener to enhance his enjoyment of the music or to evaluate an individual voice. He would also have the option of listening to any other voice being transmitted by returning his receiver.

DISCUSSION OF PRIOR ART

Learning or performing a musical piece made up of more than one voice is normally a difficult process, especially for an amateur musician. Examples of such a multi-voice musical pieces are: 1) choral with voices such as soprano, alto, tenor, bass, 2) instrumental with voices such as violin, viola, horn, oboe, percussion, or 3) any other combination of two or more instruments and/or singers performing a single musical piece whether it be classical, popular, rock, jazz, etc.

Unless the musician is highly trained, it can be difficult to sight read her voice and perform it correctly in competition with all the other voices around her. For example, when an amateur soprano singer is learning the soprano voice of a choral piece, it is very easy for her to be thrown off key by a nearby strong alto. For that reason a weak soprano singer will usually try to position herself near a strong soprano singer so she can follow the stronger soprano lead (i.e., the strong soprano provides a lead performance for the weaker soprano). The same is true of any other amateur musician. Even strong professional musicians will have this problem with difficult passages or early in learning a new piece.

An amateur musician frequently uses a recording of the musical piece to try to learn here voice. This works reasonably well for those sections in which the musician's voice is leading or is soloing or can otherwise be clearly distinguished from the other voices. This is not the case, however, in most sections of musical pieces. Usually the voices are so integrated that the musician finds such recordings of little value. In addition, the recording cannot be used during rehearsals or at the time of the performance because it will not be synchronized with the real time performance.

Another way for a musician to learn a voice of a musical piece is to employ a teacher. This can be expensive and, in a group setting, may still have the same problems of discrimination of one voice from another. Weaker musicians still tend to position themselves near the stronger musicians for leads due to the interactions of the voices and the resulting confusion.

There are many devices and methods for teaching music or assisting a performer, however most either teach a specific instrument or teach fundamental musical tones or assist the performer with these tasks. Examples of patents for teaching specific instruments are: 1) U.S. Pat. No. 4,331,061. which is an audio-visual system to assist a teacher with several students on a single type of instrument using music projected on a screen and prerecorded lessons and quizzes and 2) U.S. Pat. No. 4,386,551 which is an improvement to the first patent which reconfigures the layout of the teacher, student, and audio-visual aids. Examples of patents for teaching musical tones are: 1) U.S. Pat. No. 4,321,853 which distinguishes slight pitch errors between the student performance and the correct performance and 2) U.S. Pat. No. 4,441,399 which also distinguishes slight pitch errors and integrates a speech synthesizer for interaction with the student. None of these devices provide a means for learning a specific piece of music but instead address the issue of how to perform music in general.

A patent entitled "Musical Instruction" (U.S. Pat. No. 2,123,258) addresses the separation of the voices for instructional purposes, however it cannot be used for real time performance or rehearsal assistance because the sound channel is generated from a recording rather than in the real time of the performance or rehearsal.

OBJECTS AND ADVANTAGES

It is the primary object of this invention to assist the musical performer to learn or to perform a multi-voice musical piece by the transmission of a lead performance of an individual voice of the musical piece directly to the user. This lead performance is received by means of a receiver and earphone worn by the user and is used to help the user to learn the piece or to facilitate the delivery of his performance. This transmitted lead performance of a voice is automatically synchronized with the overall performance of the multi-voice musical piece because it is created in real time with the overall performance at the location of the performance. It is a second object of the invention to provide a personalized lead performance to each user with minimal crosstalk among the various voices. It is an additional object to increase the pleasure which a user, especially an amateur or a non-musician, derives from delivering a quality performance and doing so with a greater degree of facility, quality, and confidence as a result of using this invention.

It is a specific object of this invention to assist the non-professional and even non-musician audience participant of a complex choral work such as *The Messiah* by G. F. Handel. This performance format has become increasingly popular recently with such events as the *Sing-It-Yourself Messiah* or *Messiah Sing-Along* in which anyone interested, whether musical or not, can join in the performance from the audience. The popularity of this event has led to a need for some means to assist the amateur singers in their performances. This is driven by the simple fact that ones enjoyment of the event is strongly influenced by the quality and the facility of his performance.

The principal advantage of the present method is that the lead performance transmitted to the user is being generated in real time by a quality musician at the same performance location, so that the lead performance is automatically synchronized to the overall musical performance. It is an additional advantage that this method is specific to a musical piece rather than simply an aid to musical training in general. It is a further advantage that this method can provide an individual lead performance for as many different voices as are present in the musical piece being performed simply by providing a separate transmission for each desired voice. Use of the music performance assisting method effectively gives each user his own lead which he can adjust via the volume control of his receiver to any desired level with respect to the other voices and to the ambient acoustic level in the performance or rehearsal location. The final advantage is that the method does not interfere with the enjoyment of the individual user or of any nearby user or non-user since: 1) the user controls the sound volume individually, 2) the earphone isolates the lead performance sound from neighboring performers, and 3) a transmission can only be heard by anyone else in the performance area if that person chooses to tune in to the transmission.

The invention can be used in either the audience participation mode or the musician rehearsal mode. In the audience participation mode, it assists the audience-participation user to deliver a quality final performance by allowing him to follow the lead of a quality strong performer.

In the musician rehearsal mode, the invention would normally be used in rehearsals to help the user musician master the performance by allowing him to follow a quality strong performer during the rehearsal. Ultimately, group rehearsal is the best way to effectively integrate and fine tune a multi-voice piece of music; and in this setting, the music performance assisting method can be an enormous aid in sorting out the confusion of several voices played in unison.

If each voice is transmitted separately by the lead performer of that voice, then each user can tune in to the desired voice so he can more easily play along with the lead. The same procedure can be followed by either musician users or audience-participation users at either an actual performance or at a rehearsal.

These utilities accrue to the user in both the audience participation mode and the musician rehearsal mode. Further objects and advantages of this invention will become apparent from a consideration of the drawings and ensuing descriptions.

Figure 1:
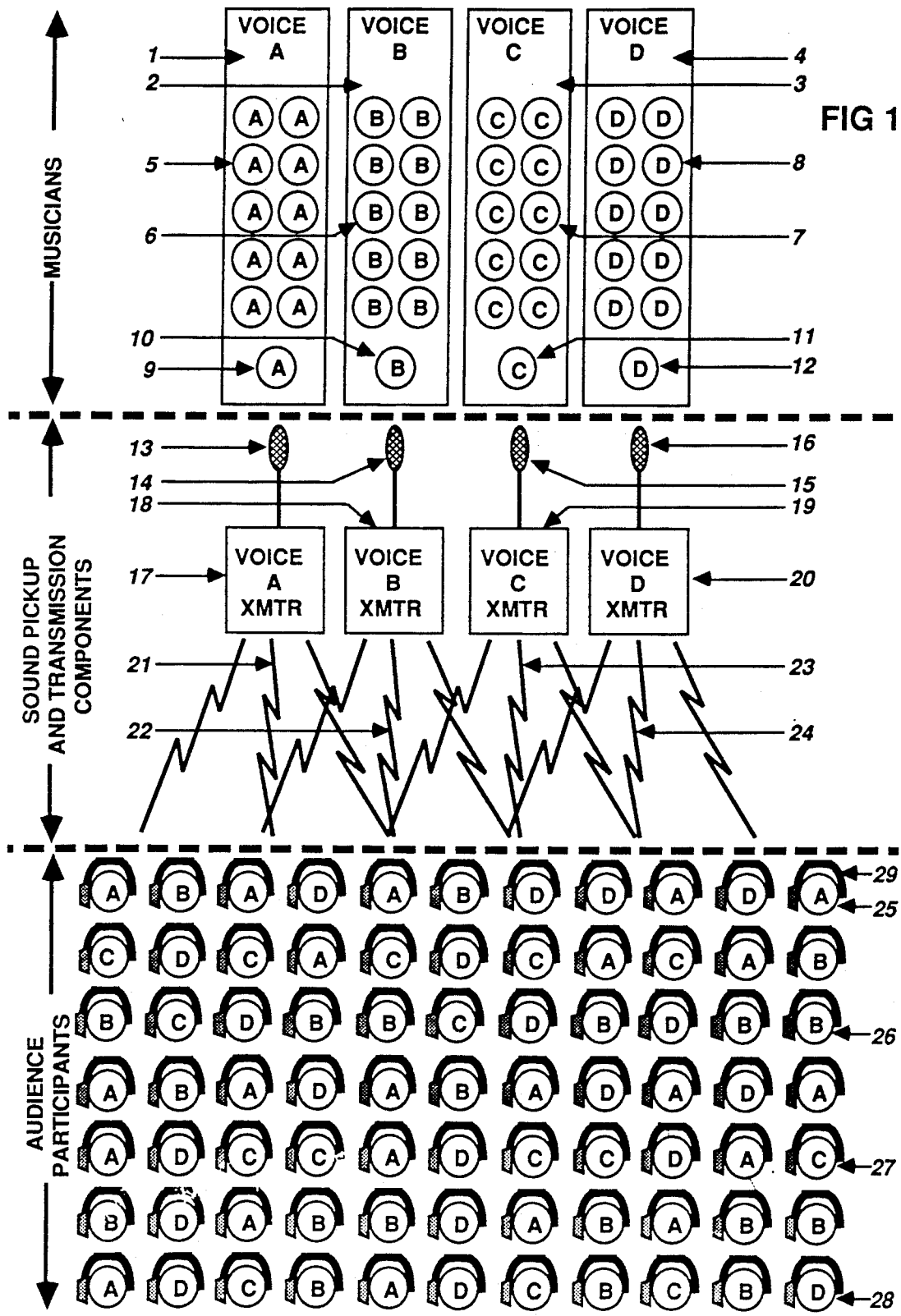
FIG. 1 presents the invention configured in the audience participation mode which is the mode in which it will most often be utilized. Each circle represents a performer, either on stage (musician) or in the audience (audience participant); and the letter inside the circle designates the voice of that performer. Four voices are illustrated and are designated A, B, C, and D which might, for example, represent soprano, alto, tenor, and bass or their instrumental counterparts (e.g., violin, viola, cello, and bass).

In the audience-participation configuration shown in FIG. 1, the audience is performing the music along with the musicians. This is representative of the situation encountered in a *Sing-It-Yourself Messiah* production where the "audience participants" sing the piece along with the "musicians". The "musicians" in the top section may be instrumentalists or singers or a combination of the two. The lead performance of each voice is independently transmitted to the entire group of "audience participants" in the bottom section, each of whom tunes in to the voice of interest to him. This received transmission is used by each of the "audience participants" as a lead to assist him to perform his voice of the musical piece.

Figure 2:
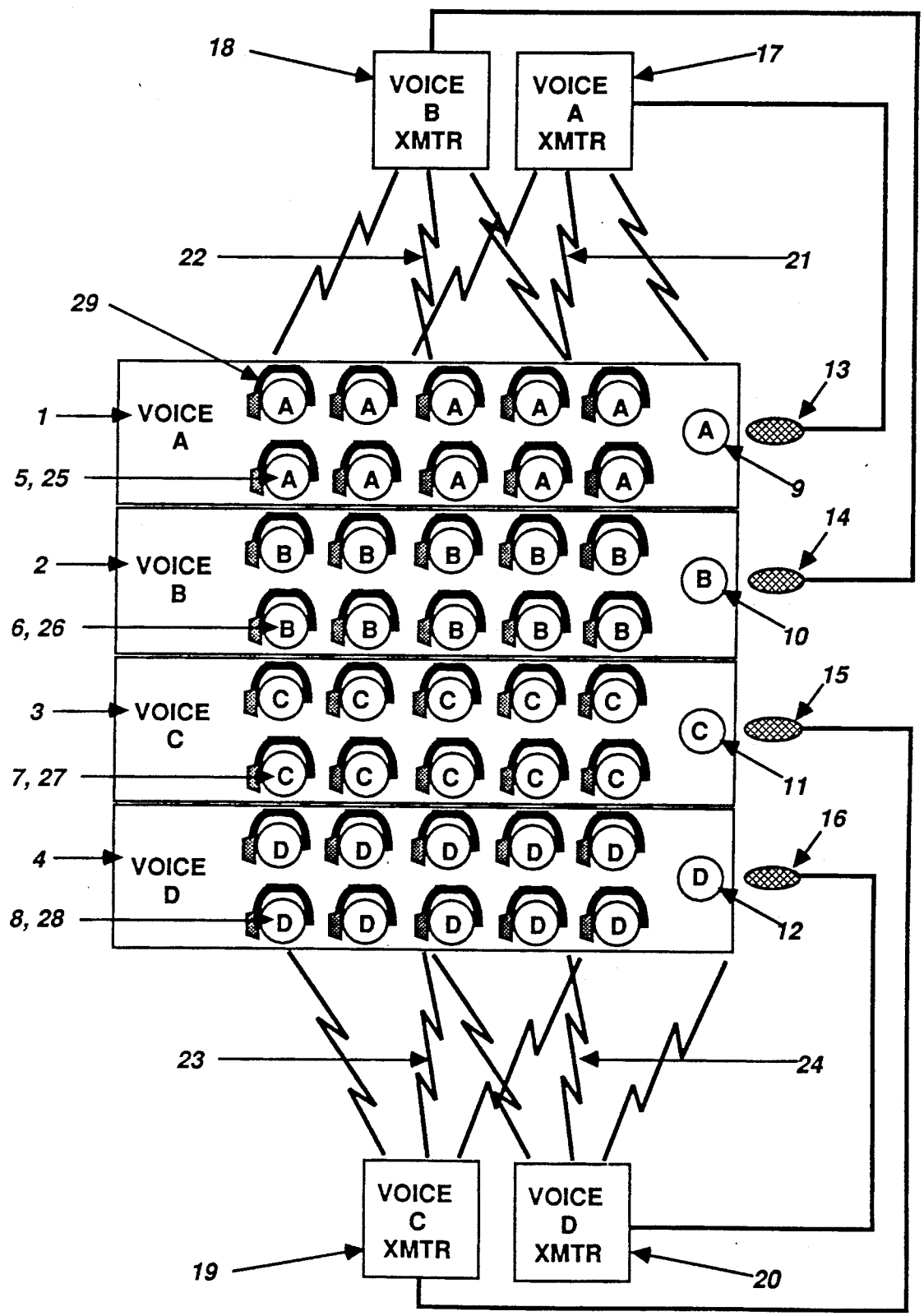

FIG. 2 presents the invention configured in the musician rehearsal mode for a rehearsal. In this case, the music is being transmitted back to the musicians who could be either instrumentalists or singers. This would normally be the situation during a rehearsal when the musicians are just learning the musical piece, however the same configuration could also be used during the actual performance of the piece to assist the weaker musicians with their performances.

DRAWING REFERENCE NUMERALS

1: the section of Voice A musicians, (e.g., violins or soprano singers)
2: the section of Voice B musicians, (e.g., violas or alto singers)
3: the section of Voice C musicians, (e.g., cellos or tenor singers)
4: the section of Voice D musicians, (e.g., basses or bass singers)
5: any one of the individual Voice A musicians
6: any one of the individual Voice B musicians
7: any one of the individual Voice C musicians
8: any one of the individual Voice D musicians
9: Voice A lead performance source
10: Voice B lead performance source
11: Voice C lead performance source
12: Voice D lead performance source
13: microphone for the Voice A lead performance source
14: microphone for the Voice B lead performance source
15: microphone for the Voice C lead performance source
16: microphone for the Voice D lead performance source
17: amplifier and transmitter for the Voice A lead performance transmission
18: amplifier and transmitter for the Voice B lead performance transmission
19: amplifier and transmitter for the Voice C lead performance transmission 20: amplifier and transmitter for the Voice D lead performance transmission
21: transmitter waves carrying the Voice A lead performance transmission
22: transmitter waves carrying the Voice B lead performance transmission
23: transmitter waves carrying the Voice C lead performance transmission
24: transmitter waves carrying the Voice D lead performance transmission
25: any one of the individual Voice A users
26: any one of the individual Voice B users
27: any one of the individual Voice C users
28: any one of the individual Voice D users
29: a receiver and earphone worn by a user

DESCRIPTION OF INVENTION

Audience Participation Embodiment

The audience participation embodiment of the invention is presented in FIG. 1. This embodiment would be used in the performance of a musical piece in which a group of substantially non-musician audience participants (25, 26, 27, 28) would gather to perform the music along with a group of substantially musicians (5, 6, 7, 8). The musical piece *The Messiah* composed by George Frederick Handel is such a piece which performance in this audience participation mode is frequently referred to as *Sing-It-Yourself Messiah* or *Do-It-Yourself Messiah* or *Sing-Along Messiah*. Such a performance will be used to exemplify the embodiment of the invention for the purpose of this description.

This embodiment of the invention comprises four microphones (13, 14, 15, 16) connected to four amplifiers and transmitters (17, 18, 19, 20), each broadcasting one of the voices of the piece, and one receiver and earphone for each of the users among the audience participants. The transmissions (21, 22, 23, 24) would most likely be in the FM band. The earphone would preferably be monaural with one earpiece since each broadcast would consist of only the solo vocal performance of the desired voice (e.g., the soprano). If an acoustic foam earpiece is used with a miniaturized receiver, such as the receiver and earphones used by joggers, the device would be unobtrusive to the listener but would still provide high fidelity and tunability to any of the four voices being transmitted. In addition, since one ear would be left entirely bare, the earphone would not interfere with the other sounds of the performance. The source of each transmitted voice would be the principal (9, 10, 11, or 12) of that voice section (1, 2, 3, or 4) or another quality soloist.

This embodiment is simply an example of how the present invention can be configured. For example, the transmission could be in the AM band, could be digitally encoded, or could even be sent over hardwires or over RF or acoustic waveguides if the performance hall is properly wired or it could even be transmitted via IR or ultrasonic waves. In addition, the piece being broadcast could be any piece of multi-voice music, whether vocal, instrumental, or combined. Some example types of scenarios include:

1) Each audience participant is a singer, and the transmission to which that audience participant is tuned is of: a) a solo singer or principal (9, 10, 11, or 12) of any one of the voices or b) an entire section of a voice (1, 2, 3, or 4), (e.g., the soprano section or the alto section) or some part of that section.

2) Each audience participant is an instrumentalist, and the transmission to which that user is tuned is of: a) a solo instrumentalist or the principal (9, 10, 11, or 12) of any one of the voices or b) an entire section of a voice (1, 2, 3, or 4), (e.g., the violin section or the cello section or the flute section) or some part of that section.

The important common element of each of these examples is that a typically non-musician audience participant is tuned in to a broadcast of one or more musicians, which broadcast is a performance of the single voice of interest or is dominated by the single voice of interest.

Musician Rehearsal Embodiment

Another embodiment of the invention is presented in FIG. 2. This embodiment would be used in the performance of a musical piece in which a group of substantially musicians gathers to rehearse or to perform a multi-voice piece of music. In this situation, the transmission would not be received by an audience but would instead be received by the musicians themselves to assist them in either learning or performing the musical piece. The musicians could be either vocalists or instrumentalists. The source of each transmission would normally be the principal of each voice (9, 10, 11, or 12) but could be any quality performer or even part of the entire section of that voice. The sound of each source would be picked up by its respective microphone (13, 14, 15, or 16) and sent to its respective transmitter (17, 18, 19, or 20) from which it is transmitted (21, 22, 23, or 24) to all of the musicians. The musicians performing or rehearsing Voice A would tune in to the Voice A transmission, and likewise for the other voices. In this way the musicians would be able to learn or to perform their voices with more facility than without this assistance.

This invention in either the audience participation (FIG. 1) or the musician rehearsal (FIG. 2) embodiments, could be used for rehearsal, for performance, or for detailed evaluation or criticism of a rehearsal or a performance. It is the intent of this patent to cover all such possible uses and embodiments.

OPERATION OF INVENTION

The above described invention can be used by setting up a microphone in the vicinity of the individual or individuals who will be providing the source for each transmission. Care should be taken to isolate each microphone (13, 14, 15, 16) as much as possible from the other voices of the piece which should be substantially excluded from each transmission. A transmitter (17, 18, 19, 20) tuned to the FM radio band would be a logical choice for transmitting each of the voice signals, although the AM band might be used in some situations. The power of each transmission would have to be scaled according to the receiver sensitivity, the size of the desired transmission footprint, and other physical and RF environmental or regulatory factors.

In the case of a choral work performed in the audience participation mode, the first transmit frequency (21) would carry the performance of a soprano soloist (9) singing along with the soprano voice (1) of the choral sections. The voice sections (1, 2, 3, or 4) are normally composed of instrumentalists accompanying the vocalists but could also be vocalists alone or instrumentalists with only four vocal lead performers. Each soprano audience participant (25) would then tune her receiver/earphone (29) to the soprano transmit frequency (21) and listen to the soprano soloist (9) through the earphone. By adjusting the volume control, she could bring the soprano soloist to any desired audio level with respect to both the ambient sound level and the other voices of the musical piece. A similar scheme would be used to transmit the alto voice (2) on a second frequency (22) and the tenor (3) and bass (4) voices on two other frequencies (23, 24).

Thus the configuration for the audience participation embodiment would consist of four sets of microphones (13, 14, 15, 16), and amplifiers and transmitters (17, 18, 19, 20), one set of these for each voice of the piece, and enough sets of receivers and earphones (29) for all of the users (25, 26, 27, 28) of the participating audience. The source of each transmitted voice (9, 10, 11, 12) can be a soloist singing along with the chorus or one or more strong singers within the chorus. In the case of an instrumental work, each lead performance source would be instrumental instead of vocal, and would normally be the principal of each voice.

The receiver and earphone (29), worn by each user should be as nonintrusive as possible and still deliver a high fidelity reproduction of the source. One way to accomplish this is to minimize its weight. Another important factor is to minimize the interference that the earphone imposes on the user's ability to listen to and to enjoy the performance. That is, its function is to simply inject the sound of the lead performance of the voice of interest into the ear of the user in such a way that it can be easily distinguished from the overall performance and yet not substantially detract from that performance. This suggests three additional desirable characteristics of the earphone:

1) It should provide sound to only one ear. This is commonly accomplished by the use of a single sided earphone with an earpiece on only one side.

2) The covered ear should provide means to allow the ambient sounds to enter without obstruction or distortion. This is commonly accomplished by the use of an acoustical foam surround over the earphone.

3) The acoustical volume and possibly the tone should be controlled by the user. In addition, the user needs a way to tune to the broadcast channel carrying the desired voice. This can be either a continuously variable tuner control or a discrete tuner selection switch with as many channel selections as voices being transmitted.

CONCLUSION AND SCOPE OF INVENTION

It has been shown that existing hardware can be configured in a new way to provide musical performers with a new method for assisting them to learn or to perform a multi-voice musical piece. This assistance method has not existed before and contains the following characteristics which have not been available in the past:

1) real time assistance with a live performance 2) individualized assistance for as many voices as desired 3) private assistance imposing no interference on neighboring users 4) unobtrusive assistance not competitive with ambient sounds 5) controllable assistance allowing user selection of volume and voice.

These and other described specifications should not be construed as limitations on the scope of the invention but rather as exemplifications of the preferred embodiments thereof. Many other variations are possible. Accordingly, the scope of the invention should not be limited by the embodiments illustrated herein, but by the claims and their legal equivalents.

What is claimed is:

1. A method of assisting a musical performer to perform said performer's voice of a multi-voice musical piece, said method comprising the following steps:
   provide said assistance in real time during a performance
   comprising a transmission of a lead performance of said musical performer's voice
   synchronization of said lead performance transmission with said multi-voice musical piece
   said transmission being received by said musical performer by a receiver and earphone means worn by said musical performer.

2. The method of claim 1 wherein said transmission is carried via electromagnetic wave means.

3. The method of claim 1 wherein said transmission is carried via hardware electrical means.

4. The method of claim 1 wherein said transmission is carried via acoustical wave means.

5. The method of claim 1 wherein said lead performance is a singular musical performer performing in real time with said performance.

6. The method of claim 1 wherein said lead performance is a plurality of musical performers performing in real time with said performance.

7. The method of claim 1 wherein said receiver and earphone incorporate means for limiting reception interference with the performance of any other musical performer at said performance.

8. The method of claim 1 wherein said receiver and earphone incorporate means for allowing said musical performer to hear ambient sounds and other voices of said musical piece without obstruction or distortion.

9. The method of claim 1 wherein said method comprises a plurality of transmissions of lead performances in a plurality of voices to a plurality of musical performers, each said musical performer receiving his lead performance in his own voice.

10. A method of assisting a musical performer to learn said performer's voice of a multi-voice musical piece during a rehearsal of a plurality of voices of said musical piece, said method comprising the following steps:
    provide said assistance in real time during a rehearsal of a plurality of voices of said musical piece
    comprising a transmission of a lead performance of said musical performer's voice
    synchronization of said lead performance transmission with said multi-voice musical piece
    said transmission being received by said musical performer by a receiver and earphone means worn by said musical performer.

11. The method of claim 10 wherein said transmission is carried via electromagnetic wave means.

12. The method of claim 10 wherein said transmission is carried via hardwire electrical means.

13. The method of claim 10 wherein said transmission is carried via acoustical wave means.

14. The method of claim 10 wherein said lead performance is a singular musical performer performing in real time with said rehearsal.

15. The method of claim 10 wherein said lead performance is a plurality of musical performers performing in real time with said rehearsal.

16. The method of claim 10 wherein said receiver and earphone incorporate means for limiting reception's interference with the performance of any other musical performer at said rehearsal.

17. The method of claim 10 wherein said receiver and earphone incorporate means for allowing said musical performer to hear ambient sounds and other voices of said musical piece without obstruction or distortion.

18. The method of claim 10 wherein said method comprises a plurality of transmissions of lead performances in a plurality of voices to a plurality of musical performers, each said musical performer receiving his lead performance in his own voice.

* * * * *